(12) United States Patent  
Duan

(10) Patent No.: US 12,488,424 B2
(45) Date of Patent: Dec. 2, 2025

(54) PROJECTION METHOD AND ELECTRONIC DEVICE

(71) Applicant: Lenovo (Beijing) Limited, Beijing (CN)

(72) Inventor: Yong Duan, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 309 days.

(21) Appl. No.: 18/232,694

(22) Filed: Aug. 10, 2023

(65) Prior Publication Data
US 2024/0062341 A1    Feb. 22, 2024

(30) Foreign Application Priority Data
Aug. 17, 2022  (CN) .......................... 202210986413.6

(51) Int. Cl.
*G06T 5/50*   (2006.01)
*G06F 3/01*   (2006.01)
*G06T 3/4038* (2024.01)
*G06T 7/70*   (2017.01)

(52) U.S. Cl.
CPC ............... *G06T 5/50* (2013.01); *G06F 3/013* (2013.01); *G06T 3/4038* (2013.01); *G06T 7/70* (2017.01); *G06F 2203/04803* (2013.01); *G06T 2207/20221* (2013.01)

(58) Field of Classification Search
CPC ........ G06T 7/70; G06F 3/017; H04L 63/0876
USPC .......................................... 382/103
See application file for complete search history.

(56) References Cited

U.S. PATENT DOCUMENTS

| 11,057,606 | B2 * | 7/2021  | Hsu ........................ H04N 13/376 |
| 2018/0324332 | A1 * | 11/2018 | Konttori .............. G02B 3/0037 |
| 2018/0356638 | A1 * | 12/2018 | Yang ........................ G06F 1/163 |
| 2019/0362557 | A1 * | 11/2019 | Lacey ........................ G06T 5/20 |
| 2020/0233222 | A1 * | 7/2020  | Peuhkurinen ........... G06F 3/013 |

FOREIGN PATENT DOCUMENTS

WO    WO-2022150217 A1 *  7/2022  ............. G06T 17/00

* cited by examiner

*Primary Examiner* — Gabriel I Garcia
(74) *Attorney, Agent, or Firm* — ANOVA LAW GROUP, PLLC

(57) ABSTRACT

A projection method includes obtaining position information of eyes of a plurality of users relative to a target screen in space, the position information including spatial coordinate information and angle information, determining, based on the spatial coordinate information, a focus area of each user on the target screen and corresponding rendering content information, rendering the rendering content information based on the angle information to obtain a rendering image corresponding to the user, and projecting the rendering image corresponding to the user onto the focus area on the target screen corresponding to the user.

20 Claims, 6 Drawing Sheets

PROJECTION METHOD AND ELECTRONIC DEVICE

CROSS-REFERENCE TO RELATED APPLICATION

The present disclosure claims priority to Chinese Patent Application No. 202210986413.6, filed on Aug. 17, 2022, the entire content of which is incorporated herein by reference.

TECHNICAL FIELD

The present disclosure relates to the projection technology field and, more particularly, to a projection method and an electronic device.

BACKGROUND

When implementing viewpoint-based augmented reality rendering or interleaved rendering on holographic transparent screens, mirror screens, or naked eye 3D screens, image rendering is typically performed based on a focus area of a user a target position. Therefore, only one person is supported for viewing and interaction. However, for large-scale holographic transparent screens, mirror screens, or naked eye 3D screens, using this method to perform augmented reality rendering or interleaved rendering results in low usability of the holographic transparent screens, mirror screens, or naked eye 3D screens. Moreover, the user experience can be impaired.

SUMMARY

Embodiments of the present disclosure provide a projection method. The method includes obtaining position information of eyes of a plurality of users relative to a target screen in space, the position information including spatial coordinate information and angle information, determining, based on the spatial coordinate information, a focus area of each user on the target screen and corresponding rendering content information, rendering the rendering content information based on the angle information to obtain a rendering image corresponding to the user, and projecting the rendering image corresponding to the user onto the focus area on the target screen corresponding to the user.

Embodiments of the present disclosure provide an electronic device, including one or more memories and one or more processors. The one or more memories are communicatively connected to the one or more processors and store instructions that, when executed by the one or more processors, cause the one or more processors to obtain position information of eyes of a plurality of users relative to a target screen in space, the position information including spatial coordinate information and angle information, determine, based on the spatial coordinate information, a focus area of each user on the target screen and corresponding rendering content information, render the rendering content information based on the angle information to obtain a rendering image corresponding to the user, and project the rendering image corresponding to the user onto the focus area on the target screen corresponding to the user.

Embodiments of the present disclosure provide a non-transitory computer-readable storage medium storing a computer program that, when executed by one or more processors, causes the one or more processors to obtain position information of eyes of a plurality of users relative to a target screen in space, the position information including spatial coordinate information and angle information, determine, based on the spatial coordinate information, a focus area of each user on the target screen and corresponding rendering content information, render the rendering content information based on the angle information to obtain a rendering image corresponding to the user, and project the rendering image corresponding to the user onto the focus area on the target screen corresponding to the user.

Embodiments of the present disclosure provide the projection method and the electronic device. The method includes obtaining position information of eyes of a plurality of users relative to a target screen in space, the position information including spatial coordinate information and angle information, determining, based on the spatial coordinate information, a focus area of each user on the target screen and corresponding rendering content information, rendering the rendering content information based on the angle information to obtain a rendering image corresponding to the user, and project the rendering image corresponding to the user onto the focus area on the target screen corresponding to the user. Thus, the augmented reality content rendering or interleaved image rendering can be performed simultaneously at the position information of the eyes of the plurality of users relative to the target screen in space. The rendering images corresponding to the users can be displayed on the focus areas corresponding to the users, respectively. Thus, the plurality of users can interact with or view the rendering images corresponding to the plurality of users simultaneously. Thus, the user experience can be improved.

The above is only a summary of the technical solution of the present disclosure. To better understand the technical solutions of the present disclosure, embodiments of the present disclosure can be implemented. To make the above and other objectives, features, and advantages of the present disclosure more apparent and understandable, embodiments of the present disclosure are described below.

DETAILED DESCRIPTION OF THE EMBODIMENTS

To make the objectives, technical solutions, and advantages of embodiments of the present disclosure more obvious, the technical solutions of embodiments of the present disclosure are described in detail below in connection with the accompanying drawings of embodiments of the present disclosure. Described embodiments are only some embodiments of the present disclosure and not all embodiments. All other embodiments obtained by those skilled in the art based on embodiments in the present disclosure without creative efforts should be within the scope of the present disclosure.

Figure 1:
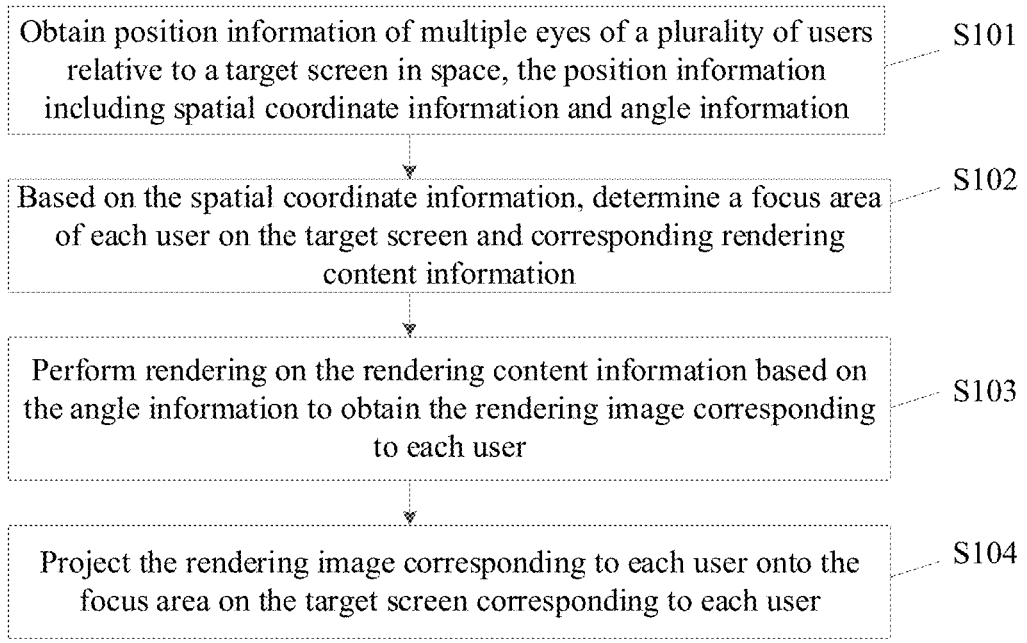
FIG. 1 illustrates a schematic flowchart of a projection method according to some embodiments of the present disclosure.

Embodiments of the present disclosure provide a projection method that can be applied to perform projection on a large-scale screen. As shown in FIG. 1, the projection method includes the following processes.

At S101, position information of multiple eyes of a plurality of users relative to a target screen in space is obtained, and the position information includes spatial coordinate information and angle information.

Figure 2:
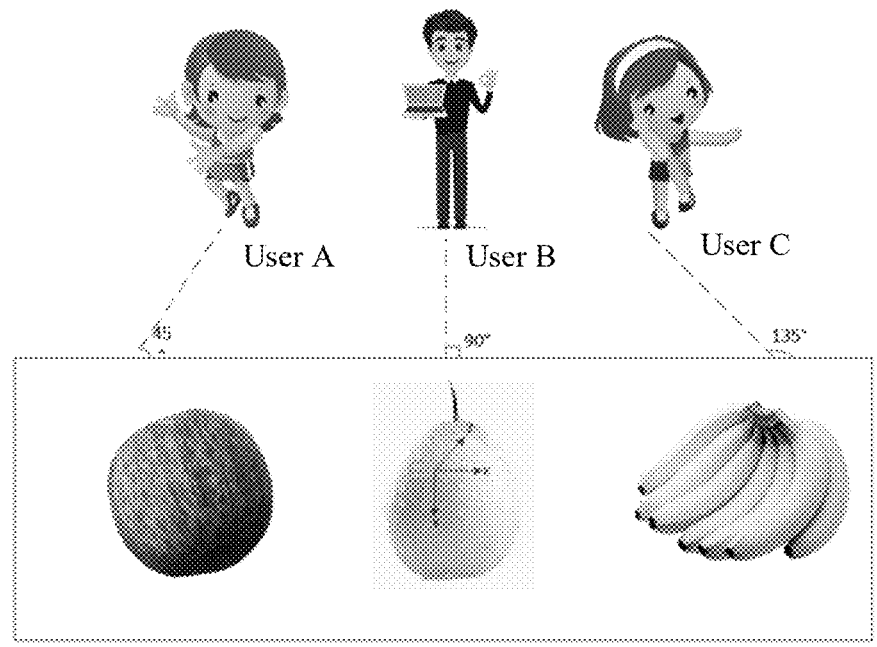
FIG. 2 illustrates a schematic diagram for displaying rendered images corresponding to a plurality of users simultaneously on a target screen according to some embodiments of the present disclosure.

In embodiments of the present disclosure, for example, a spatial coordinate can be established by using the center of the target screen as an origin. As shown in FIG. 2, when the plurality of users stand at different positions in space and at different angles in space, eyes of the plurality of users have different spatial coordinate information and angle information relative to the target screen in space. The spatial coordinate information includes X-axis coordinate information, Y-axis coordinate information, and Z-axis coordinate information, and the angle information includes the angle information relative to a plane where the target screen is arranged. As shown in FIG. 2, when user A, user B, and user C stand in front of the target screen, spatial coordinates of eyes of user A, user B, and user C include (x1, y1, z1), (x1, y1, z1), and (x1, y1, z1), respectively. Angles of the eyes of user A, user B, and user C include 45°, 90°, and 135°, respectively.

In embodiments of the present disclosure, by only taking the establishment of the spatial coordinate system using the center of the target screen as the origin as an example, the position information of the eyes of the plurality of users relative to the target screen in the space can be calculated. Three users are shown in front of the target screen, and angles of 45°, 90°, and 135° are shown exemplarily. However, the present disclosure is not limited to this. In some other embodiments, the origin of the spatial coordinate system, the number of users, and angles can be set or calculated according to actual needs.

In some embodiments, when the position information of eyes of a user relative to the target screen in the space is calculated, the position information of the center point of the head of the user relative to the target screen in the space can be used as the position information of the eyes of the user relative to the target screen in the space.

In some embodiments, a gyroscopic sensor can be configured to measure the position information of the eyes of the user relative to the target screen in space. A process of measuring the position information of the eyes of the user relative to the target screen in space using the gyroscopic sensor is a common technology, which is not repeated here.

In some embodiments, a camera, such as an infrared camera, can be arranged in space. Images of the plurality of users and an image of the target screen can be collected by the camera. The position information of the eyes of the user relative to the target screen in space can be calculated through the collected images. A process of calculating the position information of the eyes of the plurality of users relative to the target screen in space through the images is a common technology, which is not repeated here.

In some embodiments, since the technologies of holographic screens, mirror screens, or naked-eye 3D screens are well developed, augmented reality content rendering or interleaved image rendering can be performed through the holographic screens, the mirror screens, or the naked-eye 3D screens for a user to view or interact. Thus, the target screen can be a holographic screen, a mirror screen, or a naked-eye 3D screen. Then, rendering can be performed simultaneously on augmented reality content or interleaved images corresponding to the plurality of users on the same holographic screen, mirror screen, or naked-eye 3D screen. Therefore, the user experience can be further improved.

At S102, based on the spatial coordinate information, a focus area of each user on the target screen and corresponding rendering content information are determined.

In some embodiments, the rendering content information can include, but is not limited to, augmented reality content, an interleaved image, etc.

In some embodiments, a first correspondence between the spatial coordinate information and the focus area on the target screen can be predetermined. Then, based on the first correspondence between the spatial coordinate information and the focus area on the target screen, the focus area of each user can be determined on the target screen.

Figure 3:
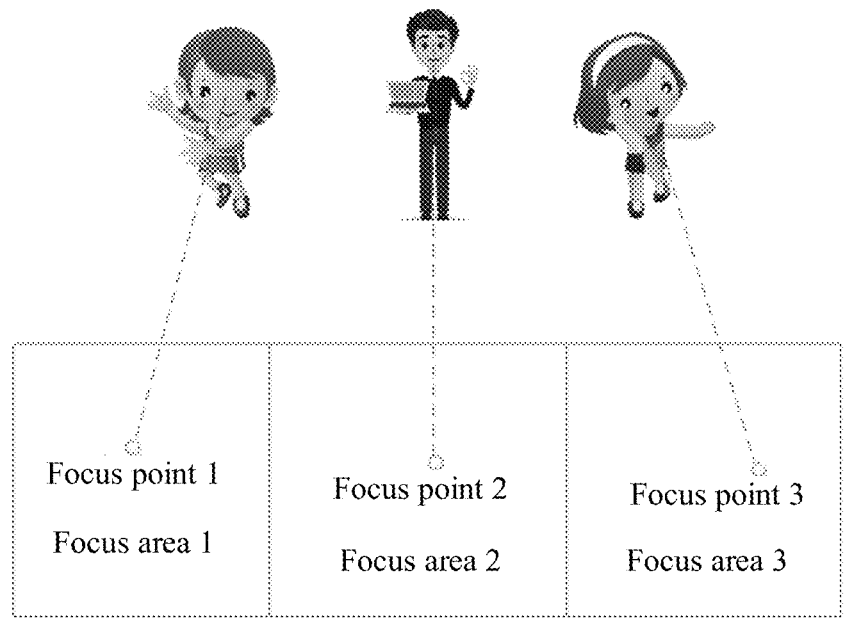
FIG. 3 illustrates a schematic diagram showing calculation of a focused area of each user on the target screen in real-time based on spatial coordinate information of eyes of each user relative to the target screen according to some embodiments of the present disclosure.

In some other embodiments, the focus area of each user can be calculated in real-time on the target screen based on the spatial coordinate information of the eyes of each user relative to the target screen. For example, as shown in FIG. 3, based on the spatial coordinate information of the eyes of each user relative to the target screen, focus point information of the eyes of each user can be determined on the target screen. Based on the focus point information of the eyes of each user, the focus area of each user can be determined on the target screen.

In some embodiments, to allow the users standing at different positions in front of the target screen to see different rendering images, rendering content information can be determined based on the spatial coordinate information of the eyes of each user relative to the target screen in space. The rendering images can be rendering images of different angles of the same rendering content information or rendering images obtained by rendering completely different content information. For example, for user A, user B, and user C shown in FIG. 2, based on the spatial coordinate information of eyes of user A relative to the target screen, rendering content corresponding to user A can be determined to be an apple, based on the spatial coordinate information of eyes of user B relative to the target screen, rendering content corresponding to user B can be determined to be a pear, and based on the spatial coordinate information of eyes of user C relative to the target screen, rendering content corresponding to user C can be determined to be a banana.

At S103, rendering is performed on the rendering content information based on the angle information to obtain the rendering image corresponding to each user.

In some embodiments, after determining the rendering content information corresponding to each user, the rendering can be performed on the rendering content information based on the angle information of the eyes of each user relative to the target screen in space to obtain the rendering image corresponding to each user. Thus, the rendering image can match the angle of the eyes of the user relative to the target screen, and the rendering image can be suitable or only for the user to view or interact with. For example, as shown in FIG. 2, the image of the apple is rotated by 45° to obtain the rendering image corresponding to user A. The image of the pear is not rotated to obtain the rendering image corresponding to user B. The image of the banana is rotated by 135° to obtain the rendering image corresponding to user C.

At S104, the rendering image corresponding to each user is projected onto the focus area on the target screen corresponding to each user.

In some embodiments, rendering images of the plurality of users can be simultaneously projected onto the focus areas on the target screen corresponding to the plurality of users. Thus, each user can view or interact with the rendering image related to the user. There is no need to limit that only one user can use the target screen to interact with or view the rendering image each time.

The projection method of embodiments of the present disclosure can include obtaining the position information of the eyes of the plurality of users relative to the target screen in space. The position information can include the spatial coordinate information and the angle information. The method can further include determining the focus area of each user on the target screen and the corresponding rendering content information based on the spatial coordinate information, performing rendering on the rendering content information based on the angle information to obtain the rendering image corresponding to each user, and projecting the rendering image corresponding to each user onto the focus area on the target screen corresponding to each user. The augmented reality content or interleaved images can be rendered simultaneously based on the position information of the eyes of the plurality of users relative to the target screen in space. The rendering image corresponding to each user can be displayed in the focus area on the target screen corresponding to each user to support the plurality of users to interact with or view the rendering images corresponding to the plurality of users on the target screen. Thus, the user experience can be improved.

Figure 4:
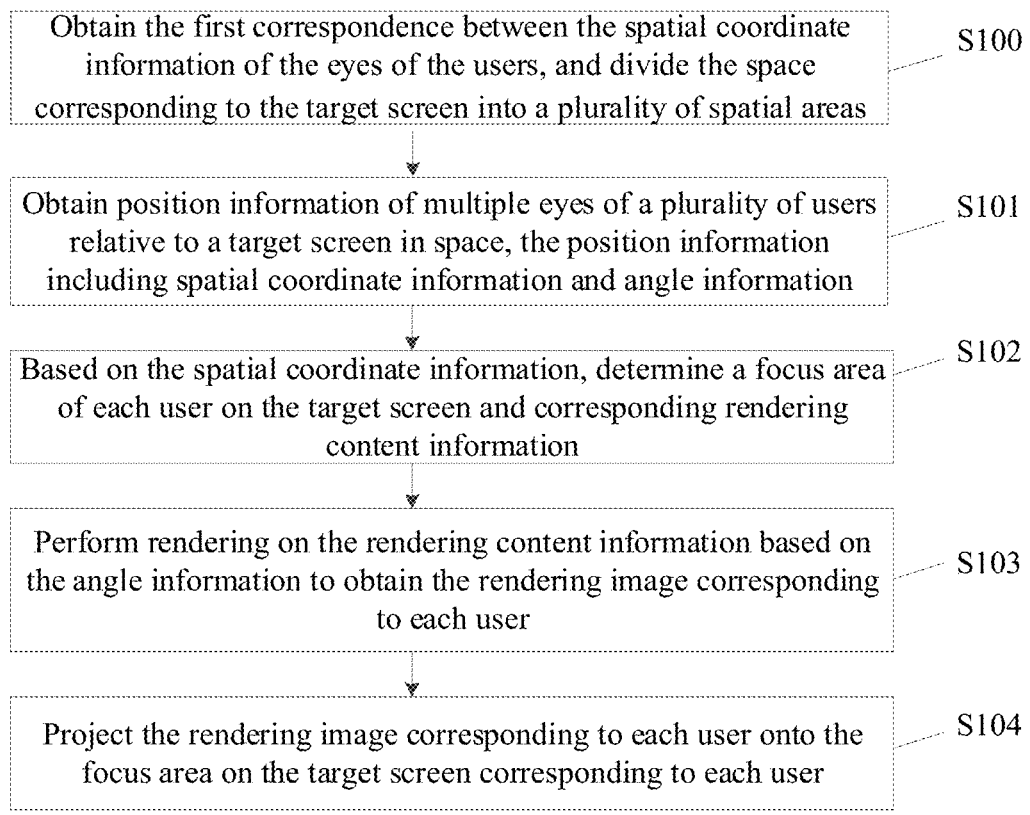
FIG. 4 illustrates a schematic flowchart of another projection method according to some embodiments of the present disclosure.

In some embodiments, the first correspondence between the spatial coordinate information and the focus area on the target screen can be predetermined. Then, the focus area of each user on the target screen can be determined based on the first correspondence between the spatial coordinate information and the focus area on the target screen. Thus, in process S101, before obtaining the position information of the eyes of the plurality of users relative to the target screen in space, as shown in FIG. 4, the projection method further includes obtaining the first correspondence between the spatial coordinate information of the eyes of the user and the focus area on the target screen.

Correspondingly, in process S102, determining the focus area of each user on the target screen based on the spatial coordinate information includes searching for the focus area of each user on the target screen from the first correspondence based on the spatial coordinate information.

In some embodiments, in process S100, obtaining the first correspondence between the spatial coordinate information of the eyes of the plurality of users and the focus areas on the target screen includes dividing the target screen into a plurality of focus areas, determining the spatial coordinate information of the eyes of each user corresponding to each focus area, and constructing the first correspondence between the spatial coordinate information of the eyes of the plurality of users and the focus areas on the target screen.

Figure 5:
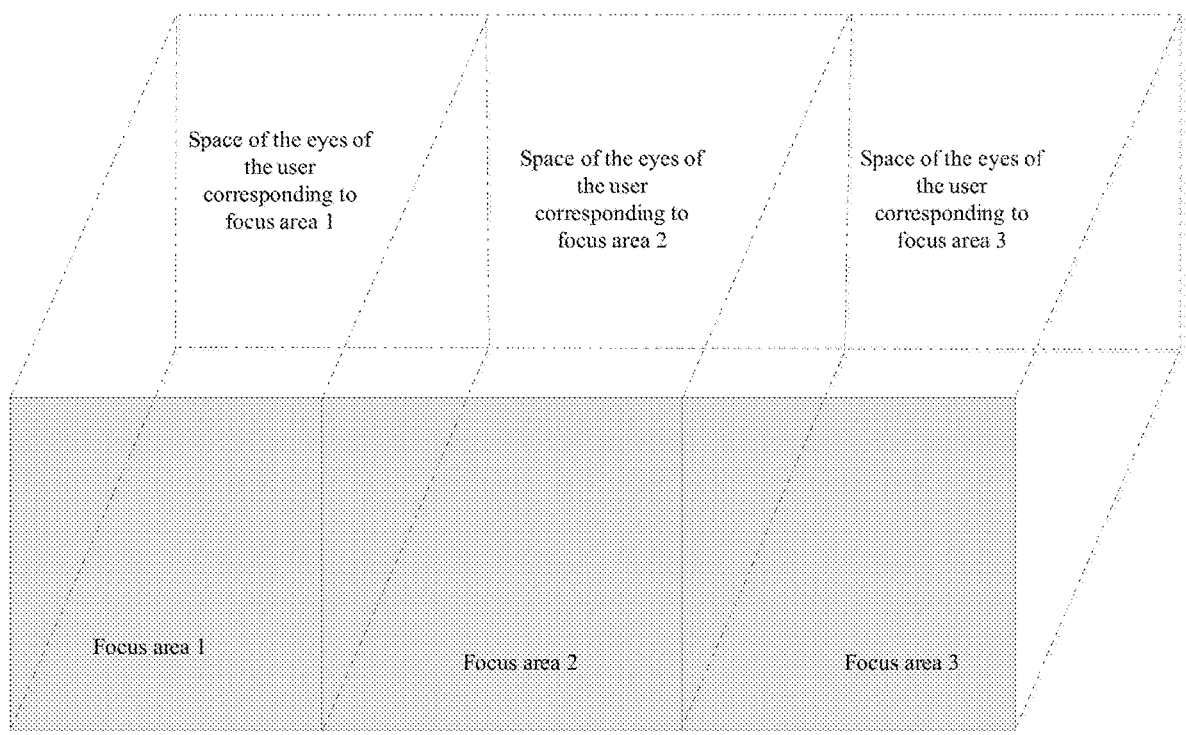
FIG. 5 illustrates a schematic structural diagram of dividing a target screen into a plurality of focused areas according to some embodiments of the present disclosure.

In some embodiments, as shown in FIG. 5, the target screen is divided into a plurality of focus areas along a horizontal direction. For each focus area, space having a predetermined distance to the focus area can be determined as the space of the eyes of the user corresponding to the focus area. The coordinate information of the space can be then used as the spatial coordinate information of the eyes of the user corresponding to the focus area. Each focus area can be associated with the spatial coordinate information of the eyes of the user. Then, the first correspondence between the spatial coordinate information of the eyes of the users and the focus areas on the target screen.

In embodiments of the present disclosure, by dividing the target screen into the plurality of focus areas and determining the spatial coordinate information of the eyes of the user corresponding to each focus area, the first correspondence between the spatial coordinate information of the eyes of the users and the focus areas on target screen can be quickly and simply constructed.

In some other embodiments, in process S100, obtaining the first correspondence between the spatial coordinate information of the eyes of the users and the focus areas on the target screen can include dividing the space corresponding to the target screen into a plurality of spatial areas, determining the spatial coordinate information corresponding to each spatial area to obtain spatial coordinate information of the eyes of the user corresponding to each spatial area, determining the focus area corresponding to each spatial area on the target screen, and based on the spatial coordinate information of the eyes of the user corresponding to each spatial area and the focus area corresponding to each spatial area, constructing the first correspondence between the spatial coordinate information of the eyes of the users and the focus areas on the target screen.

Figure 6:
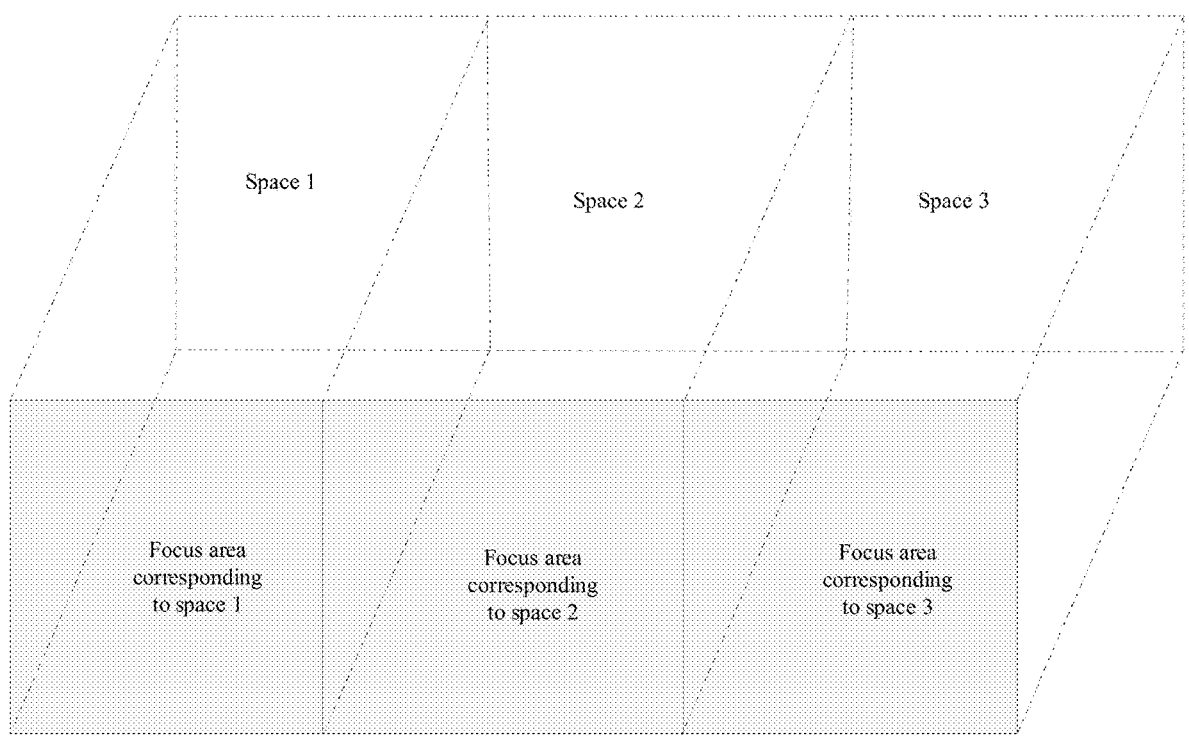
FIG. 6 illustrates a schematic structural diagram of dividing a space into a plurality of spatial areas according to some embodiments of the present disclosure.

In some embodiments, as shown in FIG. 6, the corresponding space of the target screen is divided into a plurality of spatial areas along the horizontal direction. For each spatial area, an area of the target screen directly facing the target screen can be determined as the focus area corresponding to that spatial area. The coordinate information of the space can then be used as the spatial coordinate information of the eyes of the user corresponding to that spatial area. By associating each focus area with spatial coordinate information of eyes of a user corresponding to the focus area, the first correspondence between the spatial coordinate information of the eyes of the users and the focus areas on the target screen can be obtained.

In some embodiments, by dividing the space into a plurality of spatial areas and determining the focus area corresponding to each spatial area, the first correspondence between the spatial coordinate information of the eyes of the users and the focus areas on the target screen can be quickly and simply constructed.

In some embodiments, before obtaining the position information of the eyes of the plurality of users relative to the target screen in space, by obtaining the first correspondence between the spatial coordinate information of the eyes of the users and the focus areas on the target screen, the focus area of each user on the target screen can be quickly and simply searched for from the first correspondence.

In some embodiments, in process S102, determining the rendering content information corresponding to each user based on the spatial coordinate information can include determining the spatial area in space or the focus area on the target screen of each user based on the spatial coordinate information and determining the rendering content information corresponding to each user based on the spatial area or focus area corresponding to each user.

In some other embodiments, the first correspondence between the spatial coordinate information of the eyes of the users and the focus areas on the target screen can be established, and a third correspondence between the focus areas and the rendering content information can be established. Then, the focus area of each user on the target screen can be searched for from the first correspondence based on the spatial coordinate information. Based on the searched focus area of each user on the target screen, the rendering content information corresponding to each user can be found in the third correspondence.

In some embodiments, whether a same focus area exists in the focus areas corresponding to the users can be determined first. When the same focus area is determined to exist in the focus areas corresponding to the users, for target users having the same focus area, the focus area corresponding to the target user with the spatial coordinate information satisfying the first predetermined condition can be kept. The focus area corresponding to other target users with the spatial coordinate information not satisfying the first predetermined condition can be deleted. Based on the updated focus area corresponding to each user, the rendering content information corresponding to each user can be found in the third correspondence. When the same focus area is determined to not exist in the focus areas corresponding to each user on the target screen, the rendering content information corresponding to each user can be found from the third correspondence based on the focus area corresponding to each user.

In some embodiments, by establishing the first correspondence between the spatial coordinate information of the eyes of the users and the focus areas on the target screen and the third correspondence between the focus areas and the rendering content information, the rendering content information corresponding to each user can be quickly and simply found based on the spatial coordinate information of the eyes of the users.

In some other embodiments, a correspondence between the spatial coordinate information of the eyes of the users and the spatial areas in space can be established, and a second correspondence between the spatial areas and the rendering content information can be established. Then, based on the spatial coordinate information, the spatial area of each user in space can be found from the correspondence between the spatial coordinate information of the eyes of the users and the spatial areas in space based on the spatial coordinate information. The spatial area of each user in space can be found. The rendering content information corresponding to each user can be found from the second correspondence between the spatial areas and the rendering content information based on the found spatial area of each user in space.

In some embodiments, whether the same spatial area exists in the spatial areas corresponding to each user can be determined. When the same spatial area is determined in the spatial areas corresponding to each user, for the target user having the same spatial area, the spatial area corresponding to the target user with the spatial coordinate information satisfying the first predetermined condition can be kept, and the spatial area corresponding to other target users with the spatial coordinate information not satisfying the first predetermined condition can be deleted. Based on the updated spatial areas corresponding to the users, the rendering content information corresponding to each user can be found in the second correspondence. When the same spatial area is determined to not exist in the spatial areas of the users corresponding to the target screen, the rendering content information corresponding to each user can be found in the second correspondence.

In some embodiments, by establishing the correspondence between the spatial coordinate information of the eyes of the users and the spatial areas in space and the second correspondence between the spatial areas and the rendering content information, the rendering content information corresponding to each user can be quickly and simply found based on the spatial coordinate information of the eyes of the user.

In some embodiments, by dividing the space into the plurality of spatial areas or dividing the target screen into the plurality of focus areas, the rendering content information corresponding to each user can be determined based on the spatial coordinate information of the eyes of each user. Thus, the rendering content information corresponding to each user can be differentiated.

In some embodiments, in process S102, determining the rendering content information corresponding to each user based on the spatial coordinate information can include obtaining the posture information of each user based on the spatial coordinate information and generating the rendering content information corresponding to each user based on the posture information.

In some embodiments, for each spatial coordinate information, a user image corresponding to the spatial coordinate information can be collected by the camera. The posture information of each user can be obtained by analyzing the image. The posture information can include but is not limited to hand posture information, user body posture information. The rendering content information corresponding to each user can be generated based on the posture information of each user. For example, when the posture information is the hand posture information, when the user hand posture is identified to be a heart, a heart can be generated as the rendering content information corresponding to the user. When the user hand posture is identified to be a little bird, a little bird can be generated as the rendering content information corresponding to the user. The posture information can be the user body posture information, e.g., a plurality of users perform correction on dancing movements through a mirror. When the posture information of the user body is identified, posture correction information corresponding to the posture information can be generated based on the posture information of the user body as the rendering content information of the user.

In some embodiments, the posture information of each user can be obtained based on the spatial coordinate information, and the rendering content information corresponding to each user can be generated based on the posture information. Thus, the corresponding rendering content information can be generated in real-time according to the posture of the user. Therefore, the user can change the rendering content information according to the needs of the user or correct the posture of the user as needed. Thus, the rendering content information corresponding to each user can be personalized.

In some embodiments, projecting the rendering image corresponding to each user onto the focus area on the target screen corresponding to each user can include grouping the rendering images corresponding to the users into an image based on the focus areas of the users and projecting the image onto the target screen.

In some embodiments, since the rendering image corresponding to each user needs to be projected onto the focus area corresponding to each user on the target screen, to reduce the number of projectors used and improve the projection effect, the rendering images corresponding to the users can be combined into one image based on the focus areas corresponding to the users before projecting. Then, the image can be projected onto the target screen by one projector. Thus, each user can view the rendering image corresponding to the user.

In some embodiments, because of a parallax effect of human binocular vision, the naked-eye 3D screen can be used to obtain a display system to present a realistic 3D shape with spatial and depth characteristics without any additional support apparatuses such as 3D glasses or headsets. The naked-eye 3D screen can be typically configured to display a 3D image based on a light barrier 3D technology. An implementation method of the light barrier 3D technology can include using a switch liquid crystal display, a polarization film, and a polymer liquid crystal layer and producing perpendicular stripes with a direction of 90° using the liquid crystal layer and the polarization film. The stripes can be several tens of micrometers wide. Light passing through the stripes can form a perpendicular grating pattern, which can be referred to as a parallax barrier. In this technology, by using the parallax barrier that is arranged between the backlight module and the LCD panel, in a 3D display mode, when the image that should be seen by the left eye is displayed on the liquid crystal screen, a non-transparent stripe can block a right eye. Similarly, when the image that should be seen by the right eye is displayed on the liquid crystal screen, the non-transparent stripe can block the left eye. By separating the viewable images of the left eye and the right eye, the user can see the 3D image. Thus, in some embodiments, when the target screen is the naked-eye 3D screen, each user can only see the rendered image corresponding to the user on the target screen. Thus, each user can only see the augmented reality content or mixed image related to the user and may not need to care about the augmented reality content or the mixed images of the other users.

Embodiments of the present disclosure further provide an electronic device and a readable storage medium.

Figure 7:
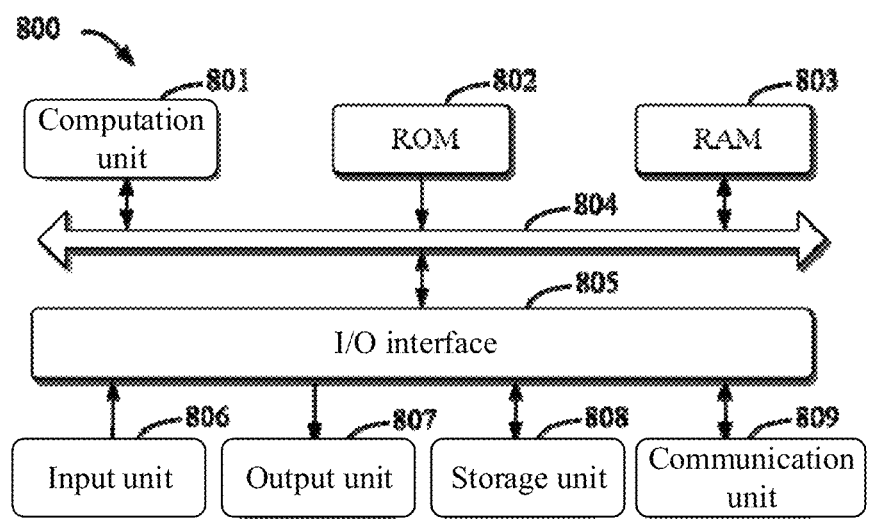
FIG. 7 illustrates a schematic structural diagram showing hardware of an electronic device according to some embodiments of the present disclosure.

FIG. 7 illustrates an exemplary block diagram of the electronic device 800 according to some embodiments of the present disclosure. The electronic device can include various types of digital computers, such as a laptop, a desktop, a workstation, a personal digital assistant, a server, a blade server, a mainframe, and another suitable computer. The electronic device can also include various types of mobile devices, such as a personal digital assistant, a cellular phone, a smartphone, a wearable device, and another similar computing device. Members, connections and relationships of the members, and functions of the members shown in the specification are merely exemplary and are not intended to limit embodiments of the present disclosure described and/or claimed here.

As shown in FIG. 7, device 800 includes computation unit 801. The computation unit 801 can be configured to perform various suitable actions and processing according to the computer program stored in the read-only memory (ROM) 802 or the computer program loaded from the storage unit 808 to the random-access memory (RAM) 803. In RAM 803, various programs and data that are required by the operation of the device 800 can be stored. Computation unit 801, ROM 802, the RAM 803 can be connected to each other via bus 804. An I/O interface 805 is also connected to the bus 804.

The plurality of members are connected to the device 800, including an input unit 806, such as a keyboard and a mouse, an output unit 807, such as various types of displays and speakers, a storage unit 808, such as magnetic disc and optical disc, and a communication unit 809, such as network card, modem, and wireless communication transceiver. The communication unit 809 can be configured to allow the device 800 to exchange information/data with another device through a computer network such as internet and/or various communication networks.

Computation unit 801 can include various general-purposture and/or specialized processing assemblies having processing and computation capabilities. In some embodiments, the computation unit 801 can include but is not limited to a central processing unit (CPU), a graphics processing unit (GPU), various specialized artificial intelligence (AI) computation chips, a computation unit running various machine learning model algorithms, a digital signal processor (DSP), and any suitable processor, controller, microcontroller, etc. The computation unit 801 can be configured to perform various methods and processes above, such as the projection method. For example, in some embodiments, the projection method can be implemented as a computer software program that is tangibly embodied in a machine-readable medium, such as the storage unit 808. In some embodiments, a part or all of the computer program can be loaded and/or installed onto device 800 via the ROM 802 and/or the communication unit 809. When the computer program is loaded into the RAM 803 and executed by the processing unit 801, one or more steps of the projection method above can be performed. In some other embodiments, computation unit 801 can be configured to perform the projection method through any other suitable manner (e.g., firmware).

Various embodiments of the systems and technologies above can be implemented in a digital electronic circuit system, an integrated circuit system, a field-programmable gate array (FPGA), an application-specific integrated circuit (ASIC), an application-specific standard product (ASSP), a system-on-chip (SoC), a complex programmable logic device (CPLD), computer hardware, a firmware, a software, and/or a combination thereof. These various embodiments can be implemented in one or more computer programs. The one or more computer programs can be performed and/or described in a programmable system including at least one programmable processor. The programmable processor can be a special-purpose or general-purpose programmable processor, which can receive data and instructions from the storage system, the at least one input device, and the at least one output device and transfer the data and instructions to the storage system, the at least one input device, and the at least output device.

Program codes for implementing the method of the present disclosure can be written in a combination of one or more programming languages. The program codes can be provided to the processors or controllers of general-purpose computers, special-purpose computers, or other programmable data processing devices to cause the functions/operations defined in the flowchart and/or block diagrams to be implemented when the program codes are executed by the processors or controllers. The program codes can be entirely or partially executed on the machine. The program codes can also be partially executed on the machine as a separate software package, which can be partially executed remotely on the machine or entirely executed remotely on the machine or servers.

In the context of the present disclosure, a machine-readable medium can be a tangible medium that includes or stores a program for use by or in connection with an instruction-execution system, device, or apparatus. The machine-readable medium may be a machine-readable signal medium or a machine-readable storage medium. The machine-readable medium can include, but is not limited to, electrical, magnetic, optical, electromagnetic, infrared, or semiconductor systems, devices, apparatuses, or a combination thereof. The machine-readable storage medium can include an electrical connection having one or more wires, a portable computer disk, a hard drive, random-access memory (RAM), read-only memory (ROM), erasable programmable read-only memory (EPROM or flash memory), optical fiber, a portable compact disc read-only memory (CD-ROM), an optical storage device, a magnetic storage device, or any suitable combination thereof.

To provide interaction with the users, the systems and technologies described here can be implemented on the computer. The computer can include a display device (e.g., a CRT or LCD monitor) configured to display information to the users and a keyboard and a pointing device (e.g., a mouse or trackball). The user can provide the input to the computer through the keyboard and the pointing device. Another type of device can be further configured to provide the interaction with the users. For example, feedback provided to the user can be any type of sensory feedback (e.g., visual feedback, auditory feedback, or tactile feedback), and the input from the user can be received in any form (including voice input, speech input, or touch input).

The systems and technologies described here can be implemented in a computation system that includes backend members (e.g., as a data server), middleware members (e.g., as an application server), or frontend members (e.g., user computers having graphical user interfaces or web browsers through which the users can interact with the systems and technologies), or any combination of the backend members, middleware members, or frontend members. The members of the system can be interconnected by digital data communication in any form or medium (e.g., communication networks). Examples of communication networks can include local area networks (LANs), wide area networks (WANs), and Internet.

The computer system can include a client and a server. The client and server are typically away from each other and interact through communication networks. The client-server relationship can be generated by running the computer programs having the client-server relationship on corresponding computers. The server can be a cloud server, a server of a distributed system, or a server combined with blockchain.

Various forms of processes above can be reordered, added, or deleted. For example, the steps of the present disclosure can be executed in parallel, sequentially, or in a different order, as long as the desired result of the technical solutions of the present disclosure can be achieved, which is not limited here.

Furthermore, the terms "first" and "second" are used for descriptive purposes only and should not be considered as indicating relative importance or implying a particular quantity of the indicated technical features. Thus, features designated with "first" or "second" can explicitly or implicitly include at least one of those features. In the description of the present disclosure, the term "a plurality of" represents two or more unless otherwise specified.

The above are merely specific embodiments of the present disclosure. However, the scope of the present disclosure is not limited to this. Those skilled in the art can easily think of modifications or replacements within the scope of the present disclosure. These modifications and replacements should be within the scope of the present disclosure. The scope of the present disclosure is subject to the scope of the claims.

What is claimed is:

1. A projection method comprising:
   obtaining position information of eyes of a plurality of users relative to a target screen in space, the position information including spatial coordinate information and angle information;
   determining, based on the spatial coordinate information, a focus area of each user on the target screen and corresponding rendering content information;
   rendering the rendering content information based on the angle information to obtain a rendered image corresponding to the user; and
   projecting the rendered image corresponding to the user onto the focus area on the target screen corresponding to the user.

2. The method according to claim 1, further comprising, before obtaining the position information of the eyes of the plurality of users relative to the target screen in space:
   obtaining a first correspondence between the spatial coordinate information of the eyes of the plurality of users and focus areas on the target screen;
   wherein determining the focus area of the user on the target screen based on the spatial coordinate information includes:
   finding the focus area on the target screen of the user from the first correspondence based on the spatial coordinate information.

3. The method according to claim 2, wherein obtaining the first correspondence between the spatial coordinate information of the eyes of the plurality of users and the focus areas on the target screen includes:
   dividing the target screen into a plurality of focus areas;
   determining spatial coordinate information of eyes of a user corresponding to a gaze area of the plurality of focus areas; and
   constructing the first correspondence between the spatial coordinate information of the eyes and the focus areas on the target screen based on the plurality of focus areas and the spatial coordinate information of the eyes corresponding to the focus areas.

4. The method according to claim 1, wherein determining the rendering content information of the user based on the spatial coordinate information includes:
   determining a spatial area in space or the focus area on the target screen of the user based on the spatial coordinate information; and
   determining the rendering content information corresponding to the user based on the determined spatial area or the focus area corresponding to the user.

5. The method according to claim 4, wherein determining the rendering content information of the user based on the determined spatial area or focus area corresponding to the user includes:
   finding the rendering content information of the user from a second correspondence between spatial areas and rendering content information based on the spatial area corresponding to the user; or
   finding the rendering content information corresponding to the user from a third correspondence between the focus areas and the rendering content information based on the focus area corresponding to the user.

6. The method according to claim 1, wherein determining the rendering content information of the user based on the spatial coordinate information includes:
   obtaining posture information of the user based on the spatial coordinate information; and generating the rendering content information corresponding to the user based on the posture information.

7. The method according to claim 1, wherein projecting the rendered image corresponding to the user onto the focus area on the target screen corresponding to the user includes:
combining rendered images corresponding to the plurality of users into an image based on the focus areas corresponding to the plurality of users; and
projecting the image onto the target screen.

8. The method according to claim 1, wherein the target screen includes a holographic screen, a mirror screen, or a naked-eye 3D screen.

9. The method according to claim 8, wherein in response to the target screen being a naked-eye 3D screen, the user only sees the rendered image corresponding to the user on the target screen.

10. An electronic device comprising:
one or more processors; and
one or more memories communicatively connected to the one or more processors and storing instructions that, when executed by the one or more processors, cause the one or more processors to:
obtain position information of eyes of a plurality of users relative to a target screen in space, the position information including spatial coordinate information and angle information;
determine, based on the spatial coordinate information, a focus area of each user on the target screen and corresponding rendering content information;
render the rendering content information based on the angle information to obtain a rendered image corresponding to the user; and
project the rendered image corresponding to the user onto the focus area on the target screen corresponding to the user.

11. The device according to claim 10, wherein the one or more processors are further configured to:
obtain a first correspondence between the spatial coordinate information of the eyes of the plurality of users and focus areas on the target screen;
find the focus area on the target screen of the user from the first correspondence based on the spatial coordinate information.

12. The device according to claim 11, wherein the one or more processors are further configured to:
divide the target screen into a plurality of focus areas;
determine spatial coordinate information of eyes of a user corresponding to a gaze area of the plurality of focus areas; and
construct the first correspondence between the spatial coordinate information of the eyes and the focus areas on the target screen based on the plurality of focus areas and the spatial coordinate information of the eyes corresponding to the focus areas.

13. The device according to claim 10, wherein the one or more processors are further configured to:
determine a spatial area in space or the focus area on the target screen of the user based on the spatial coordinate information; and
determine the rendering content information corresponding to the user based on the determined spatial area or the focus area corresponding to the user.

14. The device according to claim 13, wherein the one or more processors are further configured to:
find the rendering content information of the user from a second correspondence between spatial areas and rendering content information based on the spatial area corresponding to the user; or
find the rendering content information corresponding to the user from a third correspondence between the focus areas and the rendering content information based on the focus area corresponding to the user.

15. The device according to claim 10, wherein the one or more processors are further configured to:
obtain posture information of the user based on the spatial coordinate information; and
generate the rendering content information corresponding to the user based on the posture information.

16. The device according to claim 10, wherein the one or more processors are further configured to:
combine rendered images corresponding to the plurality of users into an image based on the focus areas corresponding to the plurality of users; and
project the image onto the target screen.

17. The device according to claim 10, wherein the target screen includes a holographic screen, a mirror screen, or a naked-eye 3D screen.

18. The device according to claim 17, wherein in response to the target screen being a naked-eye 3D screen, the user only sees the rendered image corresponding to the user on the target screen.

19. A non-transitory computer-readable storage medium storing a computer program that, when executed by one or more processors, causes the one or more processors to:
obtain position information of eyes of a plurality of users relative to a target screen in space, the position information including spatial coordinate information and angle information;
determine, based on the spatial coordinate information, a focus area of each user on the target screen and corresponding rendering content information;
render the rendering content information based on the angle information to obtain a rendered image corresponding to the user; and
project the rendered image corresponding to the user onto the focus area on the target screen corresponding to the user.

20. The storage medium according to claim 19, wherein the one or more processors are further configured to:
obtain a first correspondence between the spatial coordinate information of the eyes of the plurality of users and focus areas on the target screen;
find the focus area on the target screen of the user from the first correspondence based on the spatial coordinate information.

* * * * *